United States Patent
Haley

(10) Patent No.: US 7,481,939 B2
(45) Date of Patent: Jan. 27, 2009

(54) METHOD FOR REMOVAL OF PHOSPHATE FROM BODIES OF WATER BY TOPICAL APPLICATION OF PHOSPHATE SCAVENGING COMPOSITIONS WITH A HAND HELD, HOSE END SPRAYER

(76) Inventor: Patrick Haley, 23705 Durand Ave., Kansasville, WI (US) 53139

( * ) Notice: Subject to any disclaimer, the term of this patent is extended or adjusted under 35 U.S.C. 154(b) by 127 days.

(21) Appl. No.: 11/267,133

(22) Filed: Nov. 7, 2005

(65) Prior Publication Data

US 2007/0102366 A1 May 10, 2007

(51) Int. Cl.
*C02F 1/58* (2006.01)
(52) U.S. Cl. .......... 210/716; 210/724; 210/906
(58) Field of Classification Search ............. 210/906
See application file for complete search history.

(56) References Cited

U.S. PATENT DOCUMENTS

| | | | | |
|---|---|---|---|---|
| 4,475,689 A | * | 10/1984 | Hauger et al. | 239/318 |
| 4,507,206 A | * | 3/1985 | Hughes | 210/709 |
| 4,765,914 A | * | 8/1988 | Marikovsky et al. | 210/716 |
| 4,800,039 A | * | 1/1989 | Hassick et al. | 252/181 |
| 5,759,401 A | * | 6/1998 | Boussely et al. | 210/605 |
| 6,146,539 A | * | 11/2000 | Mills | 210/712 |
| 6,338,800 B1 | * | 1/2002 | Kulperger et al. | 210/632 |
| 6,805,149 B1 | * | 10/2004 | Gilmore | 137/268 |
| 7,063,804 B2 | * | 6/2006 | Landis et al. | 252/176 |
| 7,255,750 B2 | * | 8/2007 | Cartwright et al. | 134/42 |
| 7,294,264 B2 | * | 11/2007 | Wooton et al. | 210/236 |

* cited by examiner

*Primary Examiner*—Peter A Hruskoci
(74) *Attorney, Agent, or Firm*—Ronald Brockman

(57) ABSTRACT

This invention relates to the field of phosphate removal from a body of water, especially in pools and spas. It is an improved method of removal of phosphate from pools and spas by the topical addition with a hand held, hose end sprayer of a phosphate scavenging agent or composition, such as aluminum chlorohydrate and a suitable chemical for pH adjustment, allowing the scavenging agent or composition and phosphate to interact and for the resultant product to settle to the floor of the pool or spa. After twenty-four hours the sediment on the floor is removed by vacuuming. After a second twenty-four hour period any additional sediment that has settled to the floor is removed by repeating the vacuuming procedure.

13 Claims, No Drawings

METHOD FOR REMOVAL OF PHOSPHATE FROM BODIES OF WATER BY TOPICAL APPLICATION OF PHOSPHATE SCAVENGING COMPOSITIONS WITH A HAND HELD, HOSE END SPRAYER

BACKGROUND OF THE INVENTION

Algal growth commonly occurs in bodies of fresh water. It includes, but is not limited to, growth of any of a number of different lower photosynthetic plants such as green algae. Growth of these plants can be a problem in swimming pools and spas because it can leave a green tinge. With sufficient growth it is unsightly and often generates a disagreeable odor. The presence of plant life may provide a gateway for growth of other organisms, some of which could be harmful to a pool's users. Phosphates present in the water enhances the growth of these plants.

The present invention is related to products used to remove phosphate that is dissolved in water. It has many advantages over the previously known methods and compositions for treating pool water. One of these is that it provides for a fast acting method of phosphate removal (zero or near zero levels of phosphate may be attained within 24 hours) and avoids the undesirable side effects of the known art.

Another advantage is that the amount of phosphate scavenging agent or composition required to attain zero or near zero levels of phosphate by this invention is substantially less than is required by the customary methods of application. The amount of phosphate scavenging agent or composition is less than 25% of the amount used in previously known methods, such as the adding of phosphate scavenging compositions to pools' skimmers.

A further advantage is the ease of application of the phosphate scavenging compositions to a body of water.

This invention is also helpful in maintaining a pool as it helps avoid the pool's filter's becoming clogged with suspended debris. Pools often rely on chemical and mechanical filtration to remove undesired contaminants from the water. The effectiveness of these filters is compromised and water quality may quickly deteriorate when the filters are clogged. The usable life of the filter is also increased when the filter is kept free of blockages.

Further benefits of the method of this invention include the elimination of strong chemical odors often associated with swimming pools and an increased clarity in the treated water. An additional benefit is the removal of dissolved metals from the body of water.

One overall result is an unexpected increase in the effectiveness of the treatment program, while reducing the quantity of phosphate removing agent required compared to traditional methods of addition. Moreover, the treatment frequency is reduced.

The water in pools and spas treated in this manner is kept clear and odor free. The necessity of chemically shocking the water with chlorine or other harsh chemicals becomes less frequent. Further, the water is not irritating to the skin, eyes, and mucous membranes of the pool or spa users.

SUMMARY OF THE INVENTION

This invention relates to the field of phosphate removal from a body of water, especially in pools and spas. One of the problems in bodies of water, such as pools and spas, is the growth of algae. Such growth is enhanced by phosphate in the water. The present invention is concerned with a rapid and easy method of removal of the phosphate from the water. It is an improved method of removal of phosphate from pools and spas by the topical addition of a phosphate scavenging agent or composition, such as aluminum chlorohydrate and a suitable chemical for pH adjustment, over the entire surface. The preferred method of topical application is carried out using a hand held, hose end sprayer. The phosphate scavenging agent or composition and phosphate are allowed to interact and the resultant product is allowed to settle to the floor of the pool or spa. Twenty-four hours is usually sufficient time for settling to occur. The sediment is then removed by vacuuming. For best results the floor is again vacuumed after another twenty hours period. The procedure may be repeated until the phosphate level is satisfactory or undetectable.

The topical application of the phosphate scavenging agent removes phosphate, thereby reducing its concentration in the water to zero or near zero ppb. In a preferred method of application a concentrated solution of phosphate scavenger agent in water is diluted by a 20:1 ratio in the hose end sprayer, but greater or lesser ratios of dilution would also work. This invention provides for the rapid and easy application of phosphate removing agents to pools and spas.

DETAILED DESCRIPTION OF THE INVENTION

This invention relates to methods and systems for removing phosphates from a body of water, including swimming pools, spas, and hot tubs with a water recalculating system. A phosphate scavenging agent or composition is dissolved in water in a concentrated solution in a container of a size and shape suitable for attachment to and use with a hand held hose end sprayer. One or two pint containers allow ease of handling.

In operation the container is attached to a hose via the hand held hose end sprayer. The water is turned on and the concentrated solution is diluted (a 20:1 ratio is satisfactory) in the hand held sprayer with water under pressure from the hose. The diluted solution is applied topically to the entire surface of the body of water by means of the hand held hose end sprayer. The phosphate in the body of water and the phosphate scavenger are allowed to interact for a time sufficient to allow the phosphate scavenger to settle to the bottom of the pool carrying the phosphate with it. Twenty-four hours is usually sufficient. The sediment is then removed from the bottom by vacuuming using methods known in the art. The water recalculating system may then be turned on for one or two hours (during the application and settling the recirculating system is turned off. After another 24 hours any additional sediment that has settled is removed by vacuuming again.

The phosphate scavenging composition may be any of a number of scavenging compositions known in the art. More particularly, compositions containing metal salts, such as aluminum chlorohydrate ($Al_2ClH_5O_5$, also known as aluminum chloride hydroxide) with a suitable chemical for pH adjustment, preferably with the pH in the range of 4.0 to 5.6, so as not to alter the pH of the body of water. For example, the aluminum chlorohydrate may be at a concentration of 13-25% in the concentrated solution. Any of a number of lanthanum salts, including lanthanum sulfate, may also be applied by this procedure. Phosphate scavenging compositions containing water purifying enzymes may also be applied by the method of this invention.

In using aluminum chlorohydrate by the method of this invention the water recirculating system in the body of water is turned off during the treatment. This is done to avoid plugging filters in the recirculating system. A concentrated solution of aluminum chlorohydrate is diluted with water in the hose end sprayer, which is known in the art, at a 20:1 ratio.

However, lesser and greater dilution ratios may also be used. Any of a number of hand held hose end sprayers known in the art may he used. After the scavenging composition is applied topically over the entire surface of the body of water by the hose end hand held sprayer (a process that usually takes less than 5 minutes), it is allowed to react with phosphate in the body of water and to settle to the bottom as a sediment, carrying the phosphate with it. While the aluminum chlorohydrate may be applied to only a portion of the surface, that is not as effective as applying it over the entire surface (see Example 3 below). After 24 hours the phosphate concentration will be zero or near zero. The sediment is then removed by vacuuming by methods known in the art. The water recirculating system may then be tuned on. After another 24 hours any additional sediment that has settled may be removed by vacuuming. The procedure may be repeated, if the level of phosphate is not satisfactory. The effectiveness of the procedure is shown by the examples given below.

The methods disclosed herein can be used to bind and remove phosphates such that the level of phosphate in the water being treated is zero or near zero ppb. At these levels maintenance becomes far less work intensive. Preferably, the phosphates removed from the water through these processes are orthophosphates.

EXAMPLE 1

The pre-test concentration of phosphate in a 15,000 gallon body of water was 800 ppb. The phosphate scavenger used was aluminum chlorohydrate in a 25% concentrate in water, pH of about 4. Thirty-two fluid ounces of the 25% concentrate was applied with a hand held hose end sprayer in which the concentrate was diluted 20:1 with water from the hose. Twenty-four hours after application of the phosphate scavenger the concentration of phosphate in the water was 0 ppb. The precipitate on the bottom was removed by vacuuming. Twenty-four hours later the water was re-tested, the phosphate concentration was zero ppb.

EXAMPLE 2

A test was carried out on a 24,000 gallon body of water in which the pre-treatment phosphate concentration was 600 ppb. Twenty four hours after applying 32 fluid ounces of aluminum chlorohydrate in a 25% concentrate in water with a hand held hose end sprayer in which the concentrate was diluted 20:1, the post treatment concentration was 0 ppb. The sediment was removed by vacuuming and the water was re-tested after another twenty-four hours. The concentration of phosphate was 0 zero ppb.

EXAMPLE 3

Test three was carried out on a 14,000 gallon body of water in which the pre-treatment phosphate concentration was 650 ppb. Thirty-two ounces of aluminum chlorohydrate in a 25% concentrate in water was applied to the surface with a hand held hose end sprayer. The concentrate was diluted 20:1 in the hose end sprayer. The concentrate was applied to only one half of the surface of the body of water. The post treatment concentration was 400 ppb after 24 hours. The same quantity of aluminum chlorohydrate was applied over the entire surface of the body of water and the scavenging composition allowed to interact with the phosphate in the water. Twenty-four hours later the concentration of phosphate was 0 ppb.

The removal of phosphate to zero or near zero levels was far greater than what was expected and is attained by others methods of application. With conventional or customary methods of application of phosphate scavenging compositions to the skimmer of pools and spas more material and more steps are required. For example, it is recommended with some products to add four pounds of phosphate remover to 10,000 gallons of water to reduce phosphate levels to 600 ppb (PHOSfloc product label, Natural Chemistry). This is followed by the addition of a second phosphate remover to achieve "near zero levels" of phosphate. Compare this with the use of 32 ounces of a 25% solution added to 24,000 gallons of water (Example 2 above).

The foregoing has described the principles, preferred embodiments and modes of operation of the present invention. However, the invention should not be construed as being limited to the particular embodiments discussed. Thus, the above described embodiments should be regarded as illustrative rather than restrictive, and it should be appreciated that variations may be made in those embodiments by workers skilled in the art without departing from the scope of the present invention as defined by the following claims.

What is claimed is:

1. A method for removing phosphates from a body of water having a surface and a floor, the method comprising the steps of:
    a) forming a diluted phosphate scavenging composition by feeding a concentrated phosphate scavenging composition including aluminum chlorohydrate from a container and water under pressure from a water hose into a mixing chamber of a hand held hose end sprayer attached to the container and the water hose;
    b) spraying the diluted phosphate scavenging composition from the hand held hose end sprayer onto the surface of the body of water;
    c) allowing the diluted phosphate scavenging composition to remain in the body of water for a period of time sufficient to interact with the phosphate in the body of water and carry it to the floor of the body of water as a sediment; and
    d) removing the sediment from the floor of the body of water.

2. The method of claim 1 wherein water is fed into the mixing chamber through a first inlet in the hand held hose end sprayer, the diluted phosphate scavenging composition is fed into the mixing chamber through a second inlet in the hand held hose end sprayer and the diluted phosphate scavenging composition is sprayed from the hand held hose end sprayer through at least one outlet in the hand held hose end sprayer.

3. The method of claim 1 wherein the hand held hose end sprayer has first and second outlets, the diluted phosphate scavenging composition being sprayed only from the first outlet and the diluting water being sprayed only from the second outlet.

4. The method of claim 1 wherein the concentrated phosphate scavenging composition consists of an aqueous solution of aluminum chlorohydrate and a suitable chemical for pH adjustment.

5. The method of claim 1 wherein the step of removing the sediment consists of vacuuming the floor of the body of water.

6. The method of claim 1 wherein the method is repeated as necessary to maintain a maximum phosphate content of less than 50 parts per billion in the water.

7. A method for removing phosphate from a body of water having a surface and a floor, the method comprising the steps of:
    a) treating water with a predetermined amount of a phosphate scavenging composition including aluminum chlorohydrate by applying it to the surface of a body of water from a container and water under pressure from a water hose into a mixing chamber of a hand held hose end sprayer attached to the container and the water hose;

b) allowing the phosphate scavenger composition to react with a phosphate in the water to form an insoluble precipitate;

(c) allowing the precipitate to settle to the floor as a sediment;

(d) removing the sediment; and (e) repeating this process periodically to maintain low levels of phosphate.

8. The method of claim 7 wherein the step of removing the sediment consists of vacuuming the floor of the body of water.

9. The method of claim 8, wherein the concentrated phosphate scavenging composition is diluted by an amount of up to 20 times during the step of applying the composition to the surface of the body of water.

10. The method of claim 7, wherein water is fed into the mixing chamber through a first inlet in the hand held hose end sprayer, the diluted phosphate scavenging composition is fed into the mixing chamber through a second inlet in the hand held hose end sprayer and the diluted phosphate scavenging composition is sprayed from the hand held hose end sprayer through the outlet in the hand held hose end sprayer.

11. The method of claim 10, wherein the concentrated phosphate scavenging composition is diluted by an amount of up to 20 times during the step of applying the composition to the surface of the body of water.

12. The method of claim 7, wherein the hand held hose end sprayer has first and second outlets, the diluted phosphate scavenging composition being sprayed only from the first outlet and the diluting water being sprayed only from the second outlet.

13. The method of claim 7, wherein the concentrated phosphate scavenging composition is diluted by an amount of up to 20 times during the step of applying the composition to the surface of the body of water.

* * * * *